(12) United States Patent
Sasaki et al.

(10) Patent No.: US 7,645,075 B2
(45) Date of Patent: Jan. 12, 2010

(54) OPTICAL CONNECTION STRUCTURE OF OPTICAL BACKPLANE TO CIRCUIT SUBSTRATE

(75) Inventors: Junichi Sasaki, Tokyo (JP); Kazuhiko Kurata, Tokyo (JP); Shuji Suzuki, Tokyo (JP); Kazuhito Saito, Kanagawa (JP); Hiroshi Masuda, Ibaraki (JP); Osamu Ibaragi, Tokyo (JP); Masao Kinoshita, Tokyo (JP)

(73) Assignees: NEC Corporation, Tokyo (JP); Hirose Electric Co., Ltd., Tokyo (JP); Sumitomo Electric Induestries, Ltd., Osaka (JP); Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/543,118

(22) Filed: Oct. 5, 2006

(65) Prior Publication Data

US 2007/0086723 A1   Apr. 19, 2007

(30) Foreign Application Priority Data

Oct. 6, 2005   (JP) .............................. 2005-293768

(51) Int. Cl.
*G02B 6/36* (2006.01)
*G02B 6/38* (2006.01)
*G02B 6/00* (2006.01)

(52) U.S. Cl. ............................ 385/76; 385/55; 385/134

(58) Field of Classification Search .................. 385/53, 385/55, 76–78, 134, 137, 139
See application file for complete search history.

(56) References Cited

U.S. PATENT DOCUMENTS

2005/0047795 A1   3/2005   Windover et al.
2006/0093272 A1*  5/2006   Fenwick et al. ............... 385/57

FOREIGN PATENT DOCUMENTS

| CN | 1531663 A | 9/2004 |
|---|---|---|
| EP | 1041410 B1 | 4/2003 |
| JP | 2003-515785 A | 5/2003 |
| JP | 2004-507785 A | 3/2004 |
| WO | WO 01/40839 A1 | 6/2001 |
| WO | WO 02/16989 A1 | 2/2002 |

OTHER PUBLICATIONS

"Research and Development of Ultra High Density Electronic SI Technology, Development of Technology for Rationally Using Energy", Report Accomplishment of Study in 2000, Association of Super-Advanced Electronics Technologies, pp. 377, (2000).

* cited by examiner

*Primary Examiner*—Frank G Font
*Assistant Examiner*—Michael P Mooney
(74) *Attorney, Agent, or Firm*—Sughrue Mion, PLLC

(57) ABSTRACT

An optical backplane includes an optical connector which receives juxtaposed optical signals transmitted in nonparallel to the main surface of a circuit substrate from the circuit substrate or transmits juxtaposed optical signals in nonparallel to the main surface of the circuit substrate to the circuit substrate. The optical connector disposes and accommodates edge portions of a plurality of optical fibers and the disposing direction of the optical fibers in the optical connector is in nonparallel to the main surface of the circuit substrate.

6 Claims, 14 Drawing Sheets

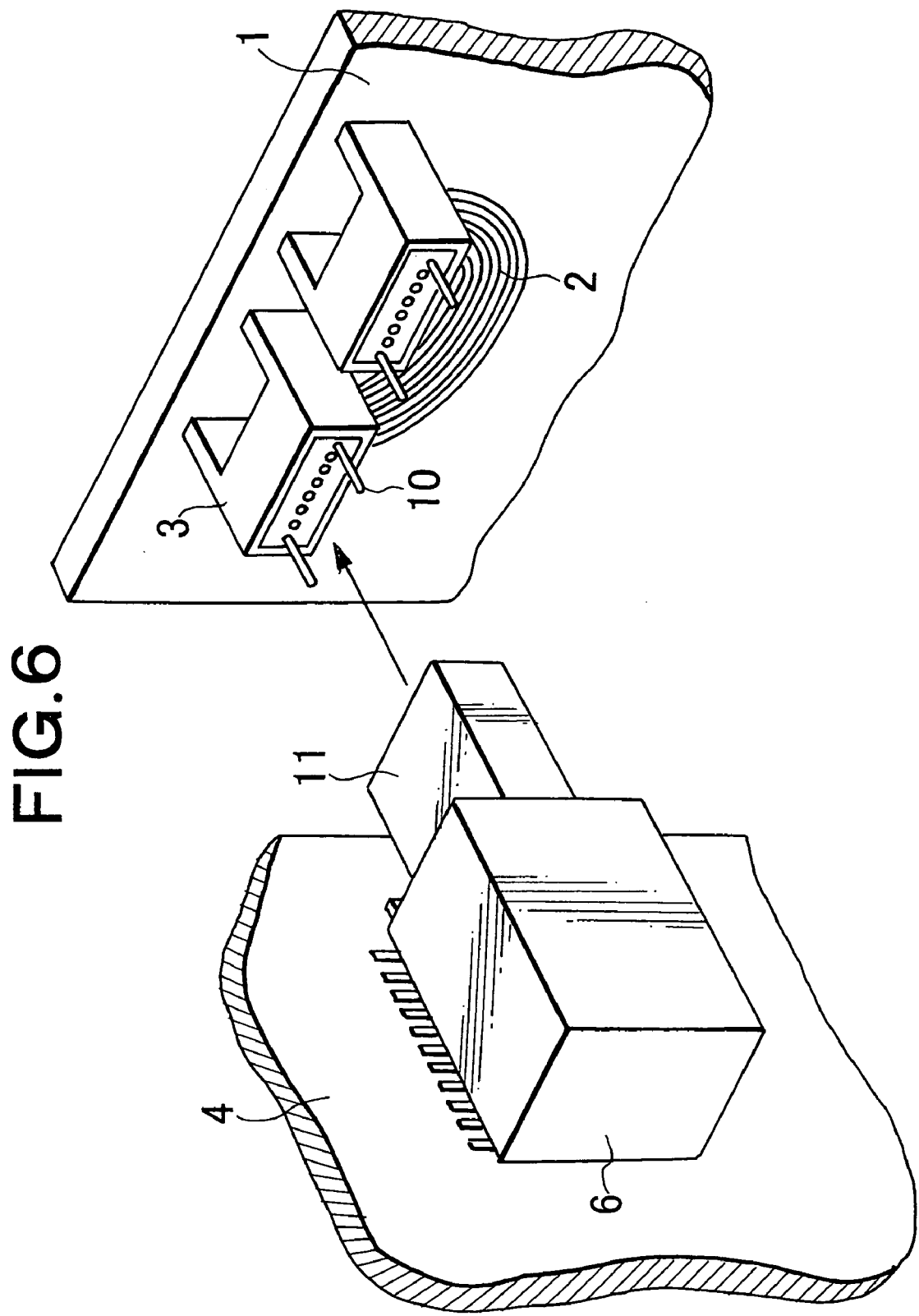

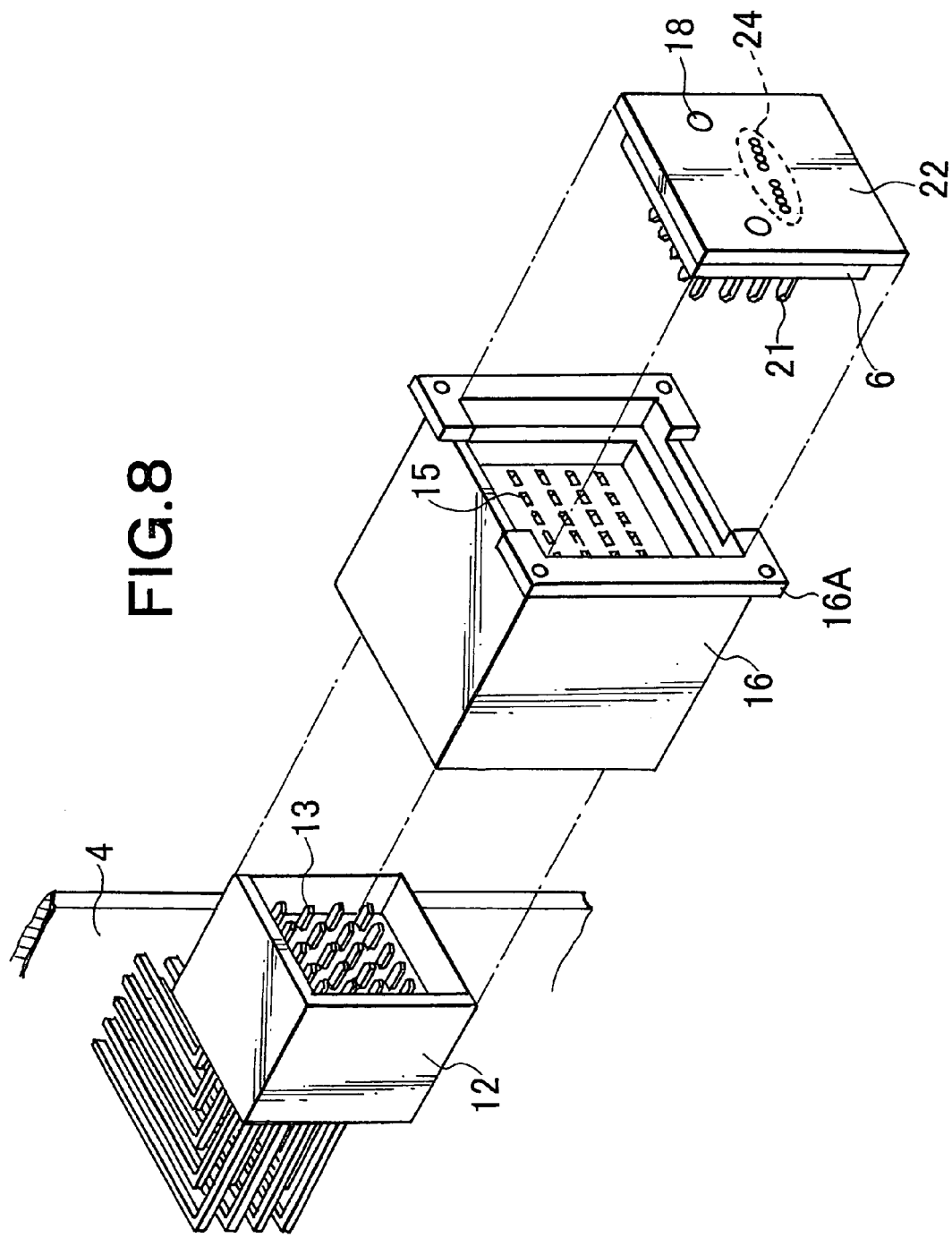

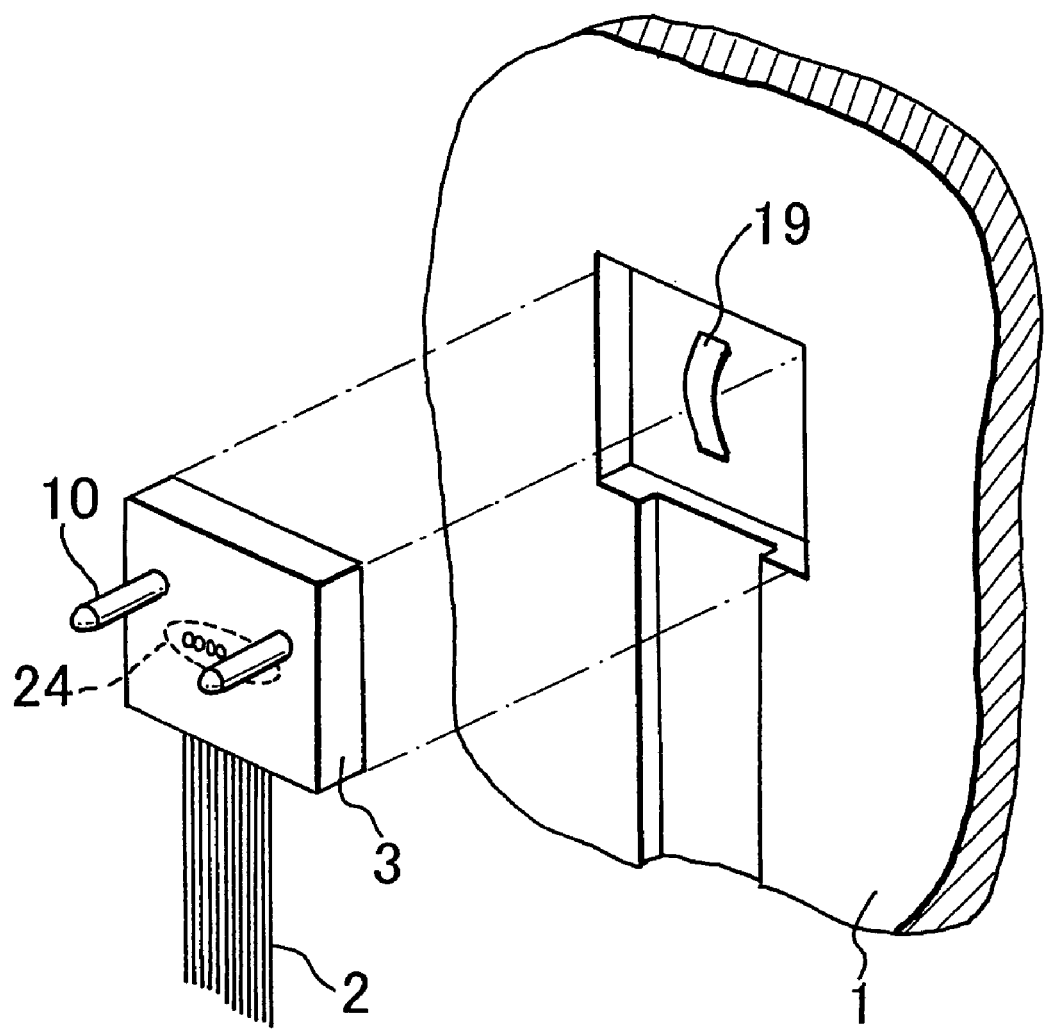

OPTICAL CONNECTION STRUCTURE OF OPTICAL BACKPLANE TO CIRCUIT SUBSTRATE

BACKGROUND OF THE INVENTION

1. Field of the Invention

The present invention relates to an optical backplane for carrying out signal connection between a plurality of circuit substrates (boards), which are mounted in information processing equipment such as a router, a server, or the like, by optical signals, and to a light transmission method.

2. Description of the Related Art

Recently, as a broadband network expands, an amount of information distributed through the network is increased. Consequently, it is required to increase the information processing capacity of information processing equipment such as a router, a server or the like. However, the limit of transmission speed of an electric substrate used in the equipment acts as a drawback to the increase of the capacity of the equipment. To further increase the information processing capacity of the information processing equipment by overcoming the drawback, it is effective to connect between boards accommodated in the equipment to each other by optical signals.

Ordinarily, the mutual optical connection of the interior of information equipment can be achieved by inserting a plurality of boards such as signal input/output boards, switch boards, and the like to an optical backplane, on which light transmission paths such as optical fibers and the like are laid, at right angles. Electric signals on a board is converted into optical signals by a photoelectric conversion module and sent to the optical backplane, and the optical signals transmitted on the optical backplane are returned to electric signals and transmitted to other board.

It is required to increase the information processing capacity of a piece of the equipment by increasing the density of boards by reducing the mounting intervals therebetween, as a requirement for making use of the advantage of the optical backplane.

A structure as shown in FIG. 1 is known as a conventional structure of the optical backplane. FIG. 1 is schematically drawn based on a photograph found in "Research and Development of Ultra High Density Electronic SI Technology, Development of Technology for Rationally Using Energy", Report of Accomplishment of Study in 2000, Association of Super-Advanced Electronics Technologies, pp. 377, (2000).

A plurality of optical fibers 2 placed in a juxtaposed state (side by side) and formed into a sheet state are attached on an optical backplane 1 (in the above document, the portion noted as Optical Fiber Board), the edge portions of the plurality of juxtaposed optical fibers 2 are bent such that the optical fibers are at right angles to the optical backplane 1, the optical fibers are attached to a connector 3 (in the above document, the connector noted as Right-Angel Connector), and the optical connector 3 is optically connected to an optical connector 5 disposed to an edge portion of a board 4. In this structure, the fibers in the edge portion of an optical fiber array are disposed in parallel with a surface of the board 4.

It should be noted that the above document and Japanese Patent Application National Publication No. 2003-515785 (FIGS. 2 to 4 and 9 to 12, and paragraph Nos. (0022) to (0023), (0027)) and Japanese Patent Application National Publication 2004-507785 (FIGS. 2 to 3 and 9 to 10) disclose that the disposing direction of a plurality of optical fibers, which are disposed to and accommodated in an optical connector passed through an optical backplane, is at a right angle to a circuit substrate, as a technology relating to the present invention.

In a structure in which a fiber disposing direction at the edge of an optical fiber array is in parallel with a surface of a board as described above, optical fibers are designed and laid to bypass a connector portion on an optical backplane as shown in FIG. 1. This is because when the optical fibers are laid to overlap a portion where a connector is attached, it is difficult to attach the connector. As a result, the optical fibers must be bent twice in a vertically standing-up portion 9 at the edges of the optical fibers and in a bypass portion 8 of the connector portion. A disadvantage arises here in that the optical fibers have a lower limit in a bending radius. According to the above documents, to bend, for example, ordinary multimode fibers twice, an interval between adjacent connectors must be set to a certain degree of length, for example, to 45 mm or more, and thus the mounting interval between boards cannot be reduced to less than 45 mm. Because of the above reasons, the structure of the conventional optical backplane has a disadvantage in that the mounting density of the optical backplane cannot be increased due to necessity of bypassing the connector portion when the optical fibers are laid and to the lower limit of the fiber-bending radius.

SUMMARY OF THE INVENTION

Accordingly, an object of the present invention is to overcome the disadvantages described above and to improve the performance of a processing capacity in information processing equipment of a mode in which substrates are connected to each other by an optical backplane.

According to a first aspect of the present invention, there is provided an optical backplane to which the circuit substrate is disposed at about a right angle and including an optical connector which receives juxtaposed optical signals transmitted in nonparallel to the main surface of the circuit substrate from the circuit substrate or transmits juxtaposed optical signals in nonparallel to the main surface of the circuit substrate to the circuit substrate, wherein the optical connector disposes and accommodates edge portions of a plurality of optical fibers and the disposing direction of the optical fibers in the optical connector is in nonparallel to the main surface of the circuit substrate.

According to a second aspect of the present invention, there is provided an optical backplane to which the circuit substrate is disposed at about a right angle and including first optical connectors which receive juxtaposed optical signals transmitted in about parallel to the main surface of the circuit substrate from the circuit substrate or transmit juxtaposed optical signals in nonparallel to the main surface of the circuit substrate to the circuit substrate, and second optical connectors connected to the first optical connectors by the plurality of optical fibers, wherein:

the first optical connectors are disposed in about parallel to the main surface of the circuit substrate; each of the first optical connectors and each of the second optical connectors dispose and accommodate both the edge portions of the plurality of optical fibers, respectively; and the disposing direction of the optical fibers at each of the first optical connectors is in about parallel with the main surface of the circuit substrate; and the disposing direction of the optical fibers at each of the second optical connector is in nonparallel with the main surface of the circuit substrate.

According to a third aspect of the present invention, there is provided a light transmission method including:

outputting a plurality of juxtaposed optical signals in nonparallel to a circuit substrate from the circuit substrate, and receiving the plurality of juxtaposed optical signals by a light connector which is disposed on an optical backplane disposed at about a right angle to the circuit substrate.

According to a fourth aspect of the present invention, there is provided a light transmission method including:

outputting a plurality of juxtaposed optical signals from a light connector which is disposed on an optical backplane disposed at about a right angle to a circuit substrate, to a circuit substrate in nonparallel therewith; and receiving the plurality of juxtaposed optical signals by the circuit substrate.

It should be noted that the term "about a right angle" used in the application also includes a case in which an angle is deviated in such a degree that it is substantially assumed a right angle, in addition to a right angle. It should be noted that the term "about parallel" used in the application also includes a case in which an angle are deviated in such a degree that it is substantially parallel, in addition to parallel.

According to the present invention, the mounting density of the circuit substrate to the optical backplane can be increased.

BRIEF DESCRIPTION OF DRAWINGS

FIG. 6 is a perspective view showing a connecting portion between a circuit substrate and the optical backplane of the embodiment in other information processing equipment;

FIG. 8 is an exploded perspective view of an electric connector on a board side, an electric connector on an optical backplane side, and a photoelectric conversion module;

FIG. 9 is an exploded perspective view of the optical backplane with an optical connector;

DESCRIPTION OF THE PREFERRED EMBODIMENTS

Embodiments of the present invention will be described below in detail with reference to the drawings.

First Embodiment

Figure 2:
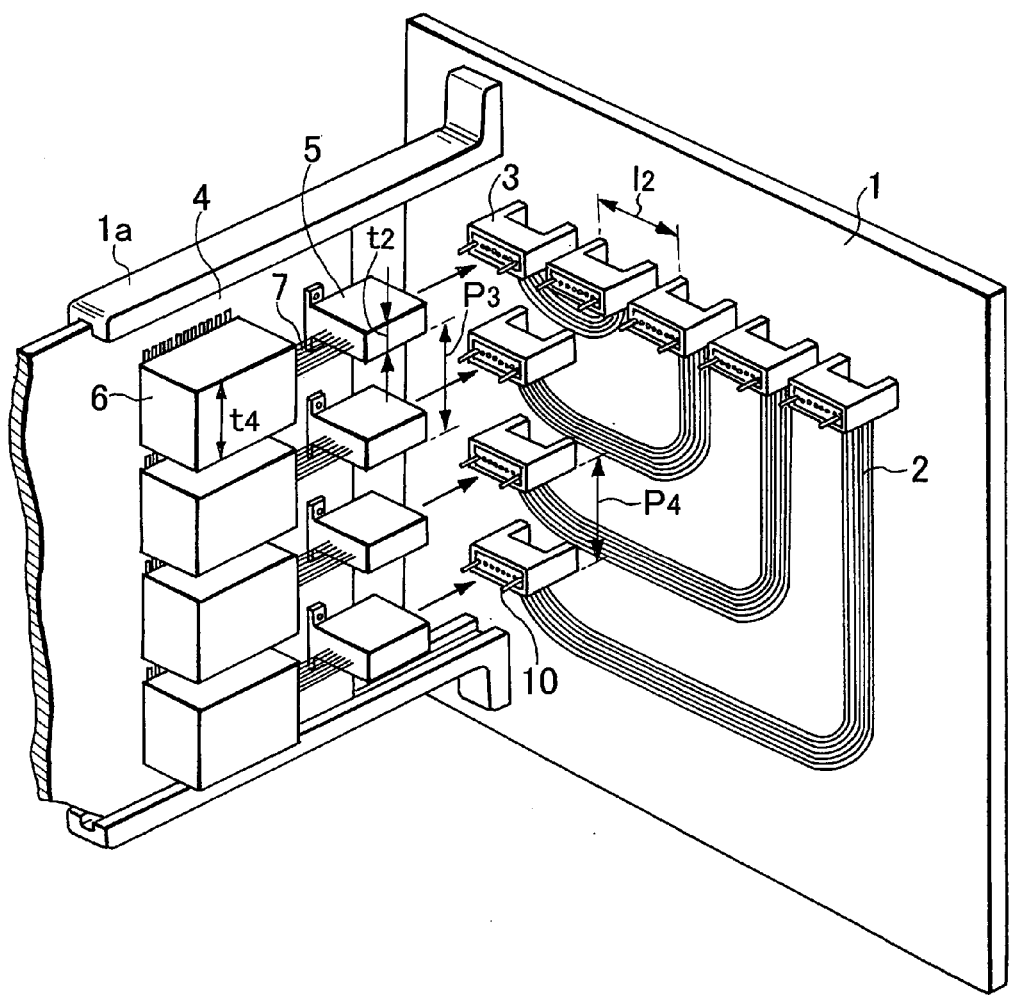
FIG. 2 is a perspective view showing a connecting portion between a circuit substrate and the optical backplane of an embodiment of the present invention in information processing equipment.
Figure 5:
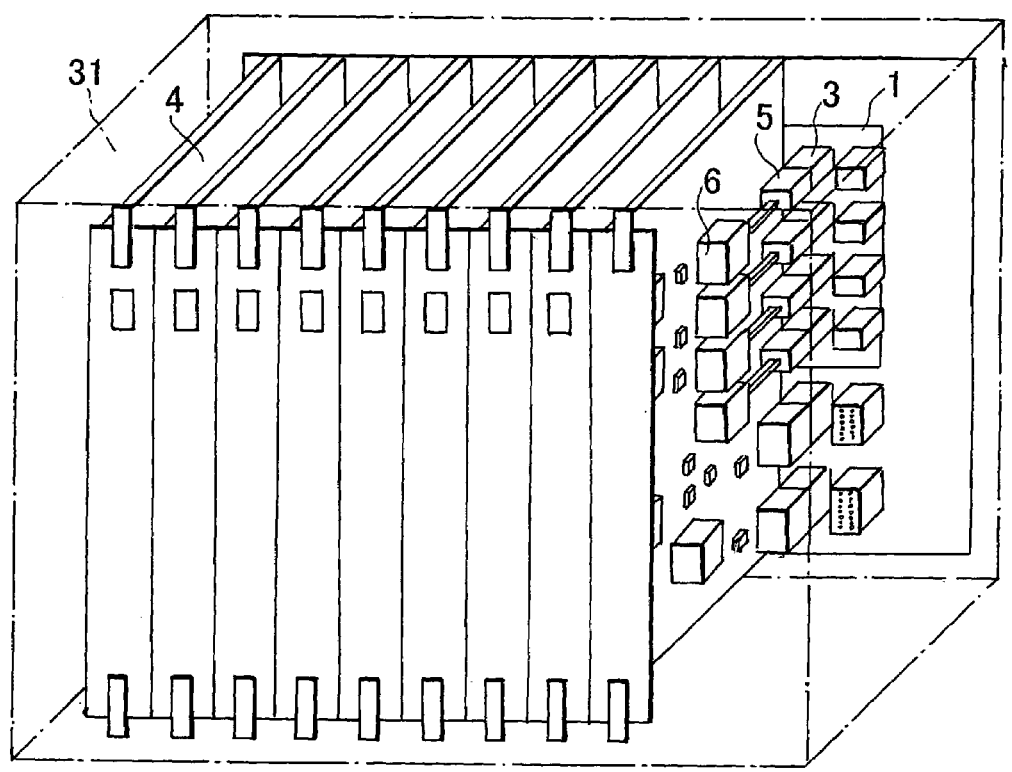
FIG. 5 is a perspective view showing an overall arrangement of the information processing equipment.

FIG. 2 is a perspective view showing a connecting portion between a circuit substrate and the optical backplane of a first embodiment according to the present invention in information processing equipment. FIG. 5 is a perspective view showing an overall arrangement of the information processing equipment.

As shown in FIG. 5, in the information processing equipment, a plurality of circuit substrates 4 are accommodated in a cabinet 31, and the plurality of circuit substrates 4 are disposed to an optical backplane 1 at about right angles. Optical connectors 5 and photoelectric conversion modules 6 on the circuit substrates side are disposed on the circuit substrates 4, and optical connectors 3 on the optical backplane side are disposed to the optical backplane 1. The optical connectors 3 are optically connected to the optical connectors 5. There are, for example, a router, a server, and the like as the information processing equipment according to the first embodiment.

As shown in FIG. 2, a plurality of optical fibers 2 placed in a juxtaposed state (side by side) and formed into a sheet state are attached on an optical backplane 1. The plurality of optical fibers 2 are attached to the optical connectors 3 while bending end portions of the optical fibers 2 such that the light incoming and outgoing direction from and to the edges of the optical fibers is at about a right angle to the main surface of the optical backplane 1. The optical connectors 3 dispose and accommodate the end portions of the plurality of optical fibers 2. With this arrangement, an optical connector correspond to a board (which acts as the circuit board) is optically wired to an optical connector corresponding to another board by the optical fibers 2. At the time, the optical connectors 3 are installed on the optical backplane 1 such that the disposing direction of the optical fibers of the optical connectors 3 is at about a right angle to the main surface of the board 4 acting as the circuit substrate.

On the other hand, the optical connectors 5, in which a plurality of optical fibers are accommodated in a juxtaposed state (side by side), are installed to an end portion of the board 4 such that the disposing direction of the optical fibers of the optical connectors 5 on the board sides is at about a right angle to the main surface of the board 4. The optical connectors 5 on the board 4 are connected to the photoelectric conversion modules 6 on the board through optical fiber arrays 7. Guides 1a are attached to the optical backplane 1, and as soon as the board 4 is inserted into the guides 1a, the optical connectors 3 on the optical backplane 1 are optically connected to the optical connectors 5 on the board 4. Although only a pair of the guides 1a are shown in FIG. 2, the guides 1a corresponding to the number of the boards inserted into the optical backplane 1 are attached to the optical backplane 1. Five boards are attached to the optical backplane 1 shown in FIG. 2, four optical connectors 5 are attached to the board on the left side in the figure, and the four optical connectors 5 are connected to the four optical connectors 3 on the optical backplane 1. The four optical connectors 3 are disposed approximately in parallel with the main surface of the board 4 (disposed in an up/down direction in the figure). One optical connector 5 is attached to each of the remaining four boards, and the optical connectors 5 on the remaining boards are connected to the remaining four optical connectors 3 on the optical backplane 1, respectively.

In FIG. 2, the optical fibers of the optical connectors 3 on the optical backplane 1 and the optical fibers of the optical connectors 5 on the board 4 are disposed in the direction at about a right angle to the main surface of the board 4. However, the direction is not limited to about a right angle, and it is sufficient that the optical fibers of the optical connectors 3 and optical connectors 5 be disposed in nonparallel with the main surface of the board 4. The disposing direction of the optical fibers is preferably 45° to 135° and most preferably about 90° (about a right angle) to the main surface of the board 4. When the disposing direction of the optical fibers of the optical connectors 5 is nonparallel with the main surface of the board 4 and the width of a conventional optical connector 5 is shown by t1, since the width of the optical connector 5 is set to t2 (width t2<width t1) as apparent from comparison of FIG. 2 with FIG. 1, the connector mounting density of the board 4 can be increased by reducing the pitch between the optical connectors (pitch P3<pitch P1).

Further, in the optical backplane 1, the pitch of the optical connectors 3 in the direction parallel with the board 4 can be also reduced (pitch P4<pitch P2). Further, in FIG. 1, since the optical connectors 3 are disposed in parallel with the main surface of the board 4, the optical fibers must be bent twice between the optical connector 3. However, when the optical connectors 3 are inclined such that they are at nonparallel angles to the main surface of the board 4, the bypass portions 8 of the connector portions of the optical fibers between the optical connectors 3 can be less bent, and thus a distance necessary to bend the optical fibers can be reduced (at 45° to 135°, almost no distance is necessary to bend the bypass portions 8 of the optical fibers, and, at about 90°, the bending itself of the bypass portions 8 of the connector portions can be eliminated). As a result, the pitch of the optical connectors 3 in the direction at about a right angle to the main surface of the board 4 can be reduced (pitch 12<pitch 11).

In the first embodiment, the optical fibers of the photoelectric conversion modules 6 are also disposed in a direction at about a right angle to the main surface of the board 4. By this structure, the width of the photoelectric conversion module 6 can be reduced, and thus the mounting density of the board 4 can be further increased. When an angle between the disposing direction of the optical fibers in the photoelectric conversion modules 6 and the main surface of the board 4 is different from an angle between the disposing direction of the optical fibers in the optical connectors 5 and the main surface of the board 4, the twist of the optical fiber arrays 7 occurs. Accordingly, it is desirable that both angles are equal (both disposing directions of the optical fibers are equal). However, both angles don't almost need to be equal. Both angles may be different in the tolerance level of the twist of the optical fiber arrays 7.

Figure 16:
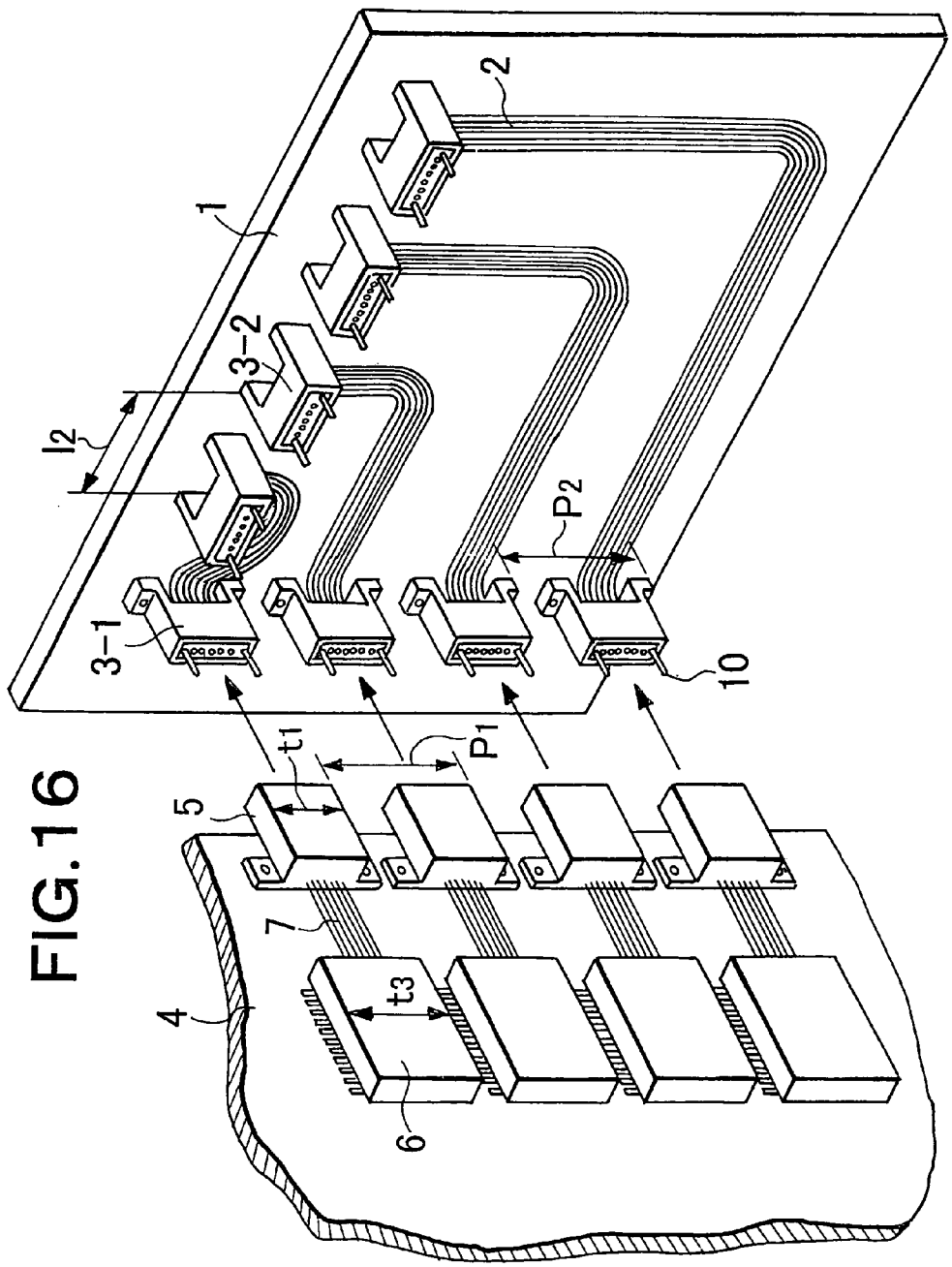
FIG. 16 is a perspective view showing a connecting portion between a circuit substrate and the optical backplane in a third embodiment of the present invention in information. processing equipment.

When the distance between the photoelectric conversion module 6 and optical connector 5 is sufficiently securable and the twist or bend of the optical fiber arrays is permissible, the both angles can be changed voluntarily. For example, even if the disposing direction of the optical fibers of the optical connector 5 is about a right angle to the main surface of the board 4, when the distance between the photoelectric conversion module 6 and optical connector 5 is sufficiently securable and the twist or bend of the optical fiber arrays is permissible, the disposing direction of the optical fibers of the photoelectric conversion modules 6 may be parallel with the main surface of the board 4. As shown in FIG. 16 on an after-mentioned third embodiment, even if the disposing direction of the optical fibers of the optical connector 5 is about parallel with the main surface of the board 4, when the distance between the photoelectric conversion module 6 and optical connector 5 is sufficiently securable and the twist or bend of the optical fiber arrays is permissible, the disposing direction of the optical fibers of the photoelectric conversion modules 6 may be nonparallel with the main surface of the board 4 (the state of nonparallel includes the state of about a right angle to the main surface of the board 4).

In the light of the improvement of the mounting density in the board 4, it isn't indispensable that the optical fibers of the photoelectric conversion modules 6 are disposed in a direction at about a right angle to the main surface of the board 4. That is, it is sufficient that the optical fibers of the photoelectric conversion modules 6 is disposed in nonparallel with the main surface of the board 4. The disposing direction of the optical fibers is preferably 45° to 135° (an angle of 45 degrees to 135 degrees) and most preferably about 90° (an angle of about 90 degrees, that is, about a right angle) to the main surface of the board 4. In the nonparallel direction, when the width of a conventional photoelectric conversion module 6 is shown by t3, since the width of the photoelectric conversion module 6 of the first embodiment is set to t4 (width t4<width t3) as apparent from comparison of FIG. 2 with FIG. 1, the width of the photoelectric conversion module 6 of the first embodiment can be reduced, and thus the mounting density of the board 4 can be increased.

Optical fibers of the photoelectric conversion modules 6 are disposed such that the direction thereof is at about a right angle to the main surface of the board 4. The photoelectric conversion module can be made by disposing a photoelectric conversion chip such that it is at about a right angle to an attachment surface of the board 4 and accommodating the chip in the photoelectric conversion module. The photoelectric conversion chip includes a light receiving device, a light emitting device, or the light receiving device and the light emitting device.

Figure 3:
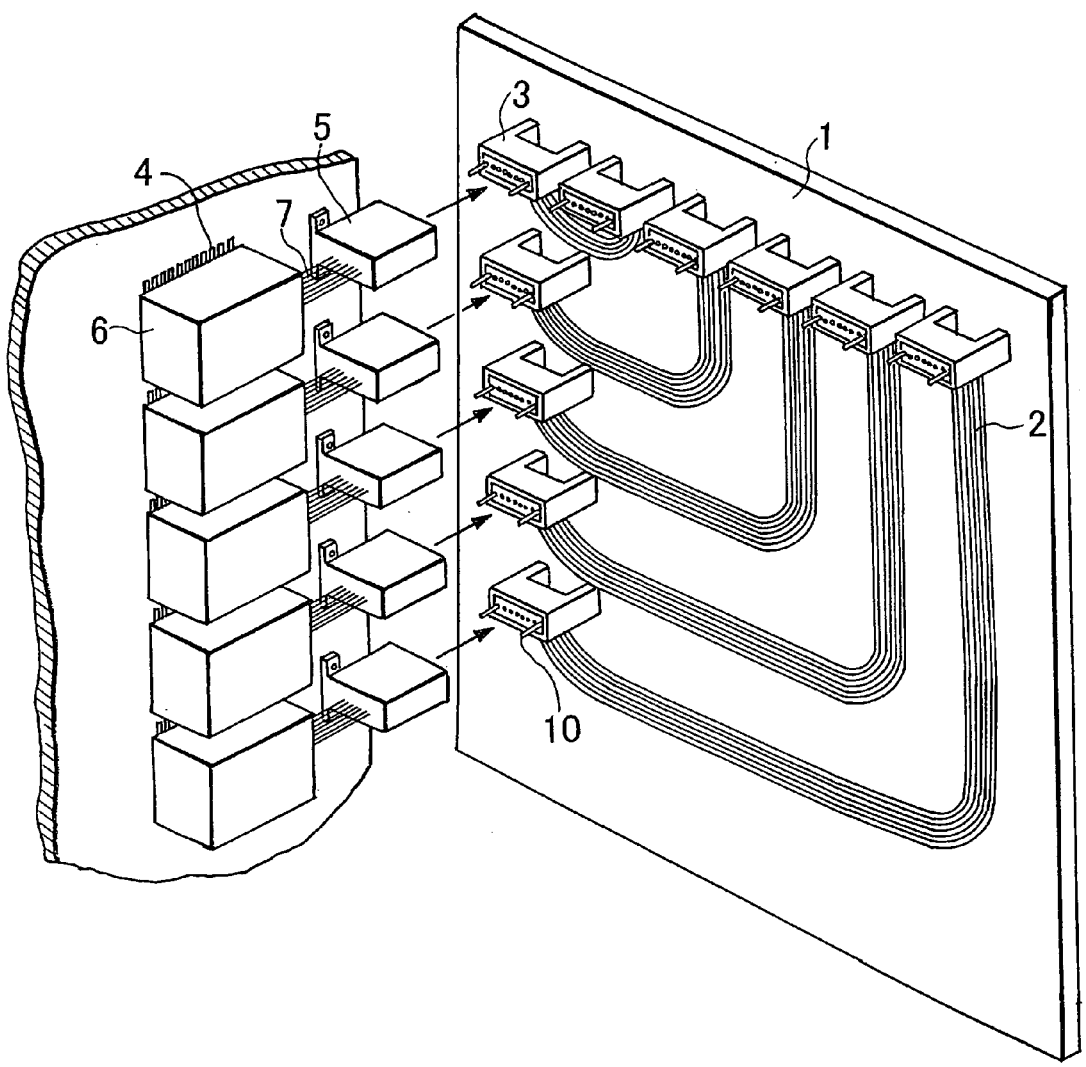
FIG. 3 is a perspective view showing a state that a mounting density of a board 4 and optical backplane 1 can be improved by increasing the number of photoelectric conversion modules 6, optical connectors 5, and optical connectors 3.

Since the width t2 of the optical connectors, the pitches P3 and P4, and the pitch 12 can be reduced as described above, the mounting density of the optical connectors 5 on the board 4 and the mounting density of the optical connectors 3 on the optical backplane 1 can be increased as shown in FIG. 3, thereby the number of the optical connectors 5 and optical connectors 3 that can be mounted can be increased.

Further, in the embodiment, although the optical fibers of the optical connectors are disposed in one row, they may be disposed in more than one row.

Figure 4:
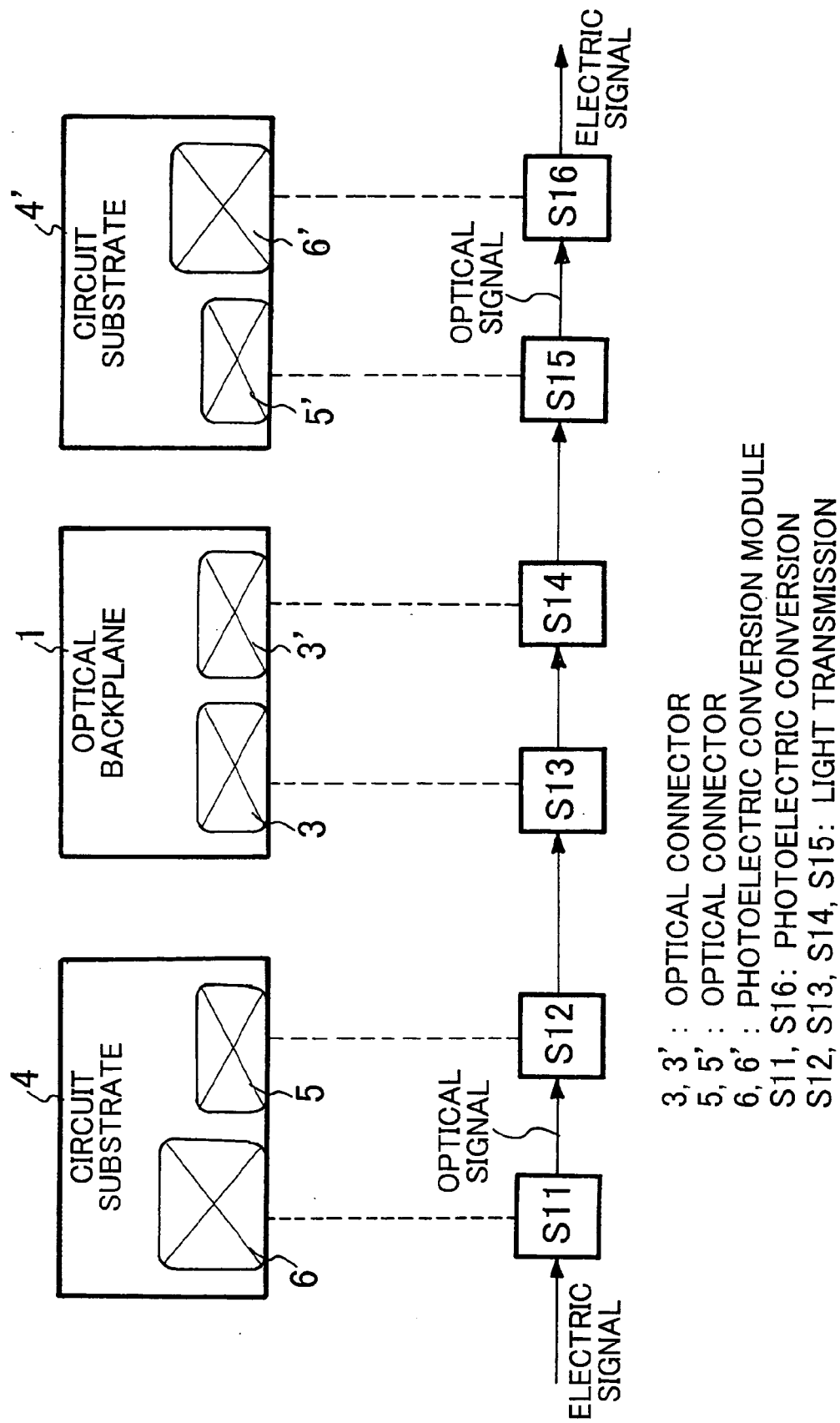
FIG. 4 is a view showing a flow of a light transmission method.

A light transmission method according to the first embodiment will be explained using FIGS. 2 and 4. FIG. 4 is a view showing a flow of the light transmission method.

Two circuit substrates (boards) 4, 4' are attached to the optical backplane 1. Electric signals are photoelectrically converted to optical signals by a photoelectric conversion module 6 disposed on the one circuit substrate 4 (step S11), the optical signals are output in nonparallel with the circuit substrate 4 in a juxtaposed state and sent to the optical backplane 1 through an optical connector 5 on the circuit substrate 4 and through an optical connector 3 on the optical backplane 1 (steps S12, S13). The optical connector 3 is connected to other optical connector 3' on the optical backplane 1 through the plurality of optical fibers 2, and thus the optical signals are sent to the other optical connector 3' (step S14). The optical signals are sent in nonparallel with the other circuit substrate 4' in a juxtaposed state through the other optical connectors 3' on the optical backplane 1 and though a connector 5' disposed on the other circuit substrate 4' (step S15) and photoelectrically converted to electric signals by a photoelectric conversion module 6' of the other circuit substrate 4' (step S16).

FIG. 6 is a perspective view showing a connecting portion between a circuit substrate and the optical backplane of the first embodiment in other information processing equipment. In FIG. 6, the same components as those of FIG. 2 are denoted by the same reference numeral, and the explanation thereof is omitted. A photoelectric conversion module 6 having an optical interface 11 connectable to an optical connector 3 is mounted to an edge portion of a board 4 acting as a circuit substrate, and light incoming and outgoing ports of the optical interface 11 of the photoelectric conversion module 6 are disposed at about right angles to the main surface of the board 4. Simultaneously with insertion of the board 4 into guides 1*a* (not shown in FIG. 6), the optical connector 3 on the optical backplane is optically connected to the optical interface 11 of the photoelectric conversion module 6 mounted on the board 4. The second embodiment has the same structure as that of the first embodiment except that the photoelectric conversion module 6 includes the optical interface 11.

The information processing equipment as shown in FIG. 6 can increase the mounting density on the board in addition to the advantage of the information processing equipment as shown in FIG. 2 because no optical fiber is disposed on the board to connect the optical connector to the photoelectric conversion module.

Second Embodiment

Figure 7A:
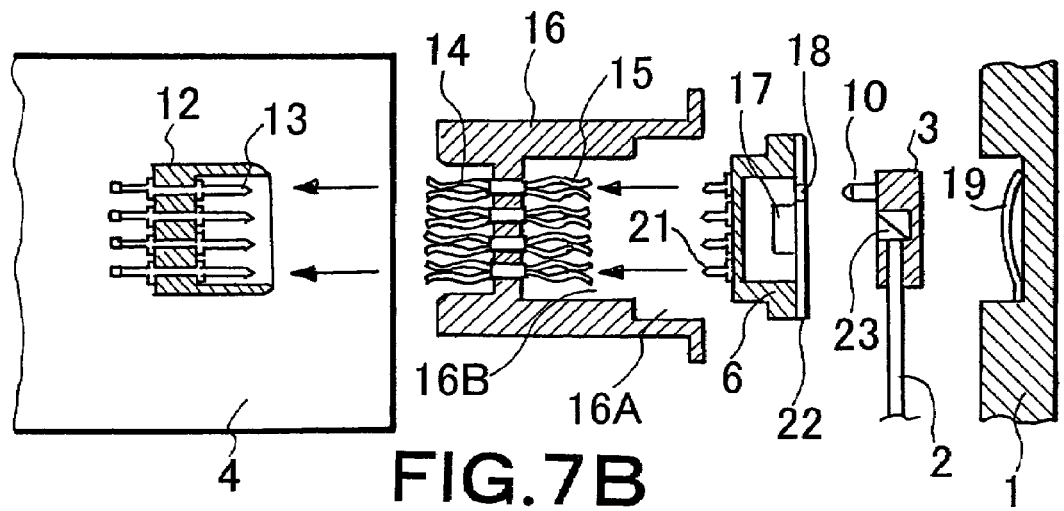
FIG. 7 is a perspective view showing a connecting portion between a circuit substrate and optical backplane of a second embodiment of the present invention in information processing equipment.
Figure 7B:
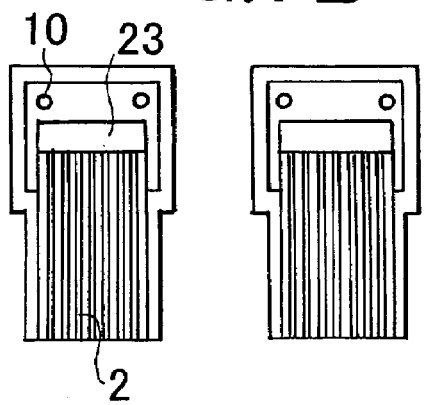
Figure 7C:
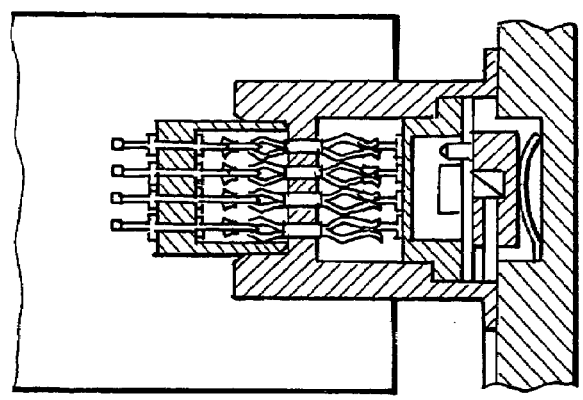

FIGS. 7A to 7C are views showing a connecting portion of a circuit substrate and optical backplane of a second embodiment of the present invention in the information processing equipment. FIG. 7A is an exploded sectional view of an arrangement of the third embodiment when viewed from the upper surface of a board, FIG. 7B is a view when viewed from the front surface of an optical backplane, and FIG. 7C is a sectional view of a state that the board is inserted into the optical backplane when viewed from the upper surface of the board.

An overall arrangement of the information processing equipment of the third embodiment is different from the first embodiment in that no photoelectric conversion module is mounted on the circuit substrate, an electric connector is disposed on the circuit substrate, an photoelectric conversion module is disposed in an electric connector on the optical backplane, and the photoelectric conversion module is directly connected to an optical connector on the optical backplane. In the information processing equipment, the circuit substrate and the optical backplane are disposed in a cabinet similarly to the arrangement shown in FIG. 5. Optical fibers 2 of the optical connector on the optical backplane side are laid similarly to FIG. 2.

FIG. 8 is an exploded perspective view of the electric connector on the board, the electric connector on the optical backplane, and the photoelectric conversion module, and FIG. 9 is an exploded perspective view of the optical connector with an optical backplane.

The electric connector 16 acting as an optical backplane connector is disposed to the optical backplane 1 on which a plurality of optical fibers 2 are laid in a juxtaposed state. Although not shown here, guides 1a are disposed to the optical backplane likewise FIG. 2 so that the board 4 can be inserted and drawn out in a direction at about a right angle to the main surface of the optical backplane 1. The photoelectric conversion module 6 is accommodated in the electric connector 16. The electric connector 16 on the optical backplane includes outside electric contacts 14 and inside electric contacts 15. The outside electric contacts 14 are electrically connected to electric contacts 13 of the electric connector 12 disposed to the board 4, and the inside electric contacts 15 are electrically connected to electric contacts 21 of the photoelectric conversion module 6. The incoming and outgoing light of the photoelectric conversion module 6 is caused to travel in a direction at about a right angle to the optical backplane 1. The electric connector 16 has a concave portion formed according to the shape of the photoelectric conversion module 6 so that the photoelectric conversion module 6 is fitted to the concave portion, thereby the photoelectric conversion module 6 can be accommodated in the electric connector 16. The inside electric contacts 15 are disposed in the concave portion (here, on the bottom of the concave portion), and the inside electric contacts 15 of the electric connector 16 are electrically connected to the electric contacts 21 of the photoelectric conversion module 6 by inserting the photoelectric conversion module 6 into the concave portion.

As shown in FIG. 8, since cutouts are formed at two positions of a part of an optical backplane attachment portion 16A of the electric connector 16 acting as the optical backplane connector and a light transmission substrate 22 of the photoelectric conversion module 6 inserted into the electric connector 16 is exposed to the cutouts, the photoelectric conversion module 6 can be taken out from the electric connector 16 by gripping the light transmission substrate 22, thereby the photoelectric conversion module 6 can be easily taken out. The incoming/outgoing light of the photoelectric conversion module 6 is caused to travel in a direction at about a right angle to the optical backplane 1. Since the incoming and outgoing light travels at about a right angle to the optical backplane 1, displacement of an optical axis is less affected by dispersion of the pushed amount of the photoelectric conversion module 6 when the photoelectric conversion module 6 is fitted to the optical connector 3.

The photoelectric conversion module 6 is electrically wired at high speed to the electric connector 12 on the circuit substrate through the electric contacts 21, 15, 14, and 13.

A fitting hole 18 is formed to the light transmission substrate 22 of the photoelectric conversion module 6 so that a guide pin 10 disposed to the optical connector 3 is fitted into the fitting hole 18. The electric contacts 21 of the photoelectric conversion module 6 are kept in contact and in electric conduction with the inside electric contacts 15 of the electric connector 16 by the elastic force of the inside electric contacts 15. With this structure, even if the photoelectric conversion module 6 fails, it can be easily replaced by removing the electric connector 16, thereby good maintenability can be ensured.

To replace the photoelectric conversion module 6, the board 4 is drawn and removed from the electric connector 16, and the electric connector 16 is removed from the optical backplane 1. Next, the photoelectric conversion module 6 accommodated in the electric connector 16 is taken out, and a new photoelectric conversion module is accommodated therein. Here, since the electric connector 16 acting as the optical backplane connector is fixed to the optical backplane 1 by screws, the electric connector 16 is taken out from the optical backplane 1 by removing the screws.

The optical connector 3, which has a 45° mirror (45 degrees mirror) 23 acting as a light path converter and the guide pin 10, is attached to an edge portion of the optical fibers 2 on the optical backplane 1. The optical connector 3 is positioned by fitting the guide pin 10 thereof into the fitting hole 18 on the photoelectric conversion module 6. An optical device 17 in the photoelectric conversion module 6 is optically coupled with the optical fibers 2 through the 45° mirror (45 degrees mirror) 23 in the optical connector 3. The optical device is a light receiving device, a light-emitting device, or the light receiving device and the light-emitting device. The light-receiving device has a plurality of light receiving portion and the light emitting device has a plurality of light emitting portions. The optical device 17 receives the light from the optical connector 3 and converts it into electric signals, or/and converts the electric signals from the board 4 into optical signals. Since the optical fibers 2 are coupled with the photoelectric conversion module 6 through the 45° mirror 23, they need not be bent. Accordingly, the optical connectors can be disposed at a narrow pitch by reducing the intervals therebetween irrespectively of the limit of the bending radius of the optical fibers which becomes a problem when a light path is converted by bending optical fibers. The optical device 17 is disposed on a semiconductor substrate which is disposed on the light transmission substrate 22, and a convex module body is disposed on the light transmission substrate 22 so as to cover the optical device 17. The electric contacts 21 are disposed on the module body.

A spring 19 is interposed between the optical connector 3 and the optical backplane 1, thereby the photoelectric conversion module 6 is kept in physical contact with the optical connector 3 by the elastic force of the spring 19. With this arrangement, it can be prevented that a coupling efficiency is made unstable by intervals excessively formed between the photoelectric conversion module and a light transmission path.

It is sufficient that an elastic body be inserted between the optical connector 3 and the optical backplane 1, and a coiled spring, a rubber sheet, a leaf spring, urethane, and the like may be used in place of the spring.

Figure 10:
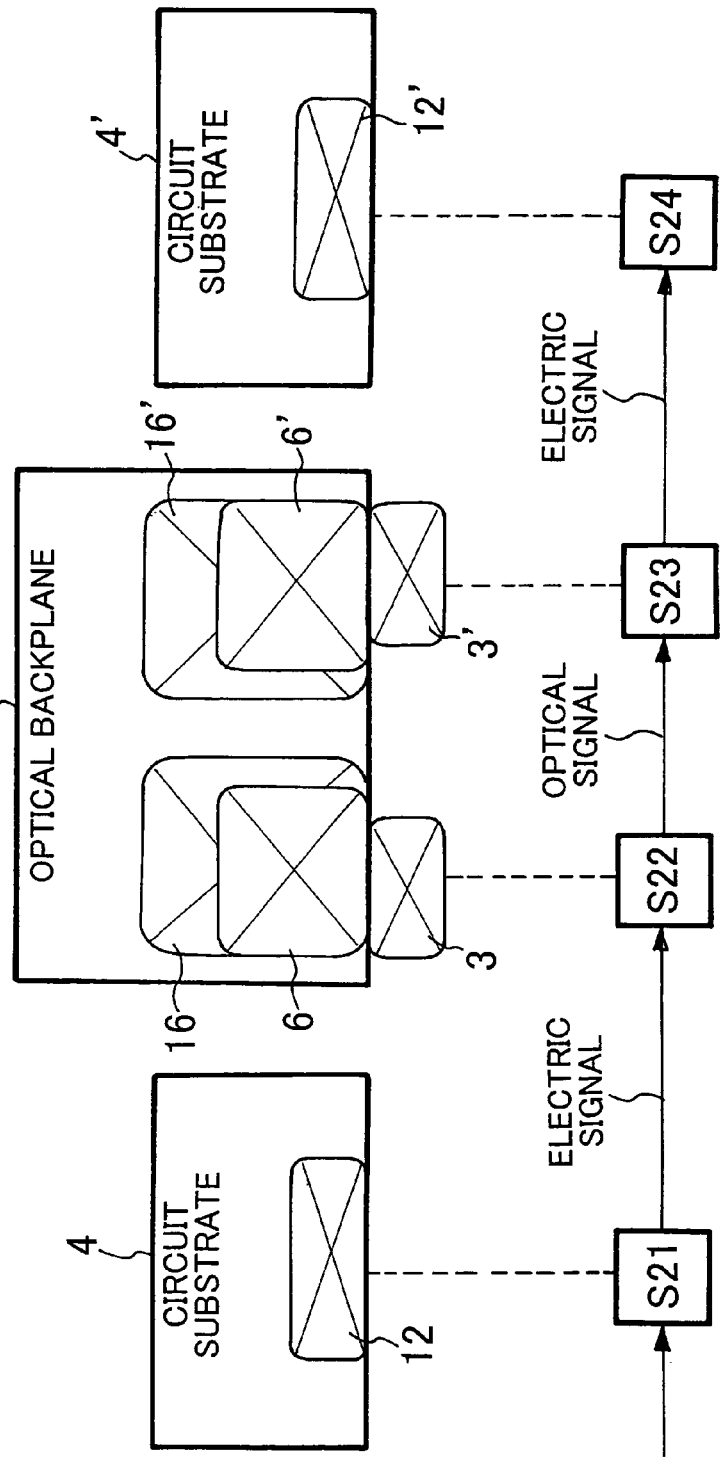
FIG. 10 is a view showing a flow of a light transmission method.

A light transmission method according to the third embodiment will be explained using FIG. 10.

The two circuit substrates 4, 4' are attached to the optical backplane 1, and the electric signals processed by a circuit disposed on the one circuit substrate 4 are output from the electric connector 12 on the circuit substrate 4 (step 21), input to the photoelectric conversion module 6 in the electric connector 16 attached to the optical backplane 1, and photoelectrically converted into optical signals (step S22). The optical signals are output to the optical connector 3 in nonparallel with the circuit substrate 4 in a juxtaposed state, sent to a photoelectric conversion module 6' in other electric connector 16' through optical fibers and other optical connector 3', thereby the optical signals are photoelectrically converted into electric signals (step S23). The photoelectrically converted electric signals are sent to other electric connector 12' of the other circuit substrate 4' connected to the other electric connector 16' of the optical backplane 1 and subjected to signal processing by the other circuit substrate 4' (step S24).

Figure 11:
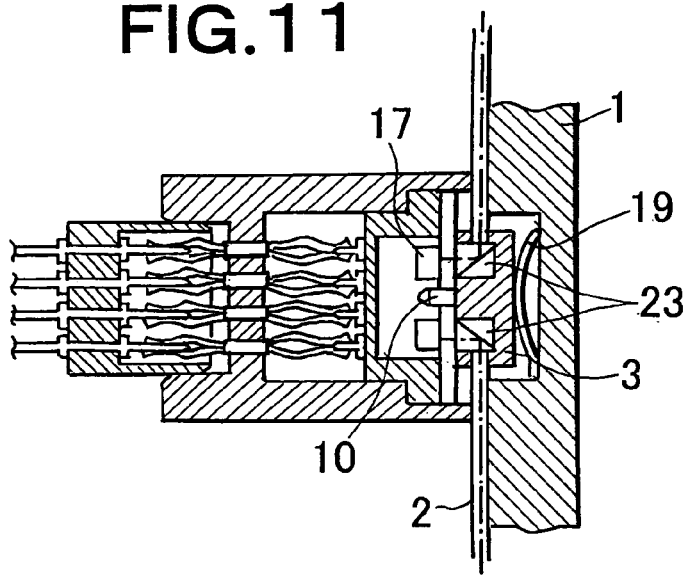
FIG. 11 is a sectional view showing an arrangement when two optical devices are accommodated in the photoelectric conversion module.

In the arrangement explained above, the case, in which one optical device is accommodated in the photoelectric conversion module, is explained. In the third embodiment, however, two optical devices may be accommodated in the photoelectric conversion module as shown in FIG. 11.

The two optical devices 17 are accommodated in a photoelectric conversion module 6, and two 45° mirrors are disposed in an optical connector 3 and coupled with optical fibers 2 extending in different directions, respectively. A fitting hole 18 on the photoelectric conversion module 6 side is formed between the optical devices 17, and a guide pin 10 of the optical connector 3 is inserted into the fitting hole 18. With the embodiment arranged as described above, when, for example, a switch substrate acting as a circuit substrate mounted in the vicinity of a central portion of a lack is connected to signal input and output substrates acting as a circuit substrate mounted on both right and left sides, and the like, optical fibers can be simply wired on an optical backplane, thereby they can be optically connected to each other effectively. Although the case that the two optical devices and the two optical fibers 2 are employed is explained in FIG. 11 to make explanation understandable, more than two optical devices and optical fibers may be employed.

Further, in the third embodiment, the optical backplane may be provided with a lid so that the photoelectric conversion module can be drawn out from the optical backplane side.

Figure 12A:
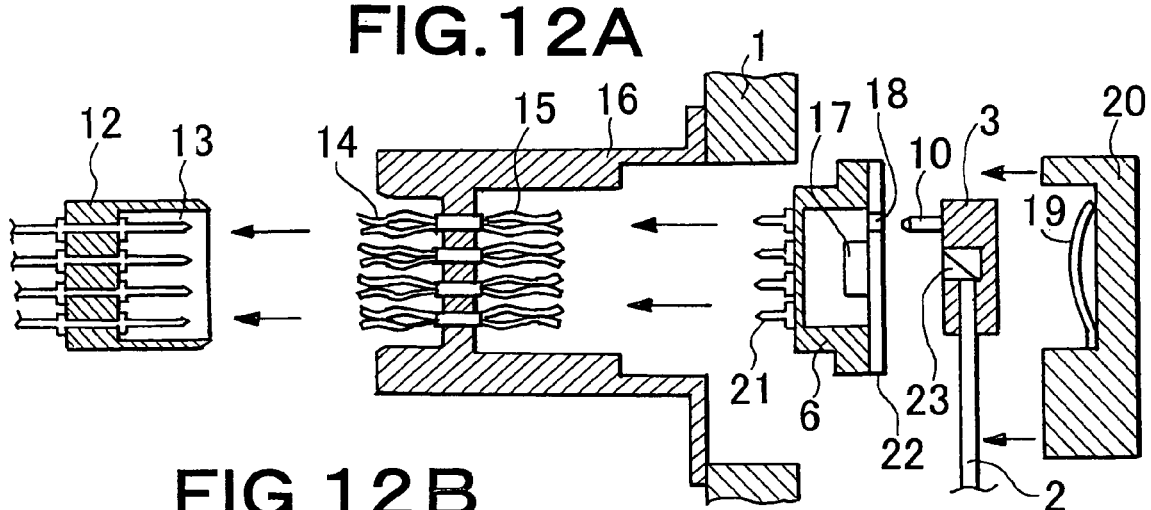
FIG. 12A is a sectional view of the arrangement when viewed from the upper surface of a board.
Figure 12B:
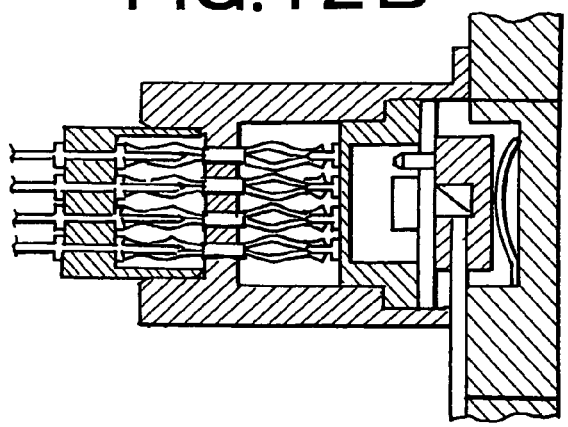
FIG. 12B is a sectional view of a state when the board inserted into an optical backplane is viewed from the upper surface thereof.
Figure 13:
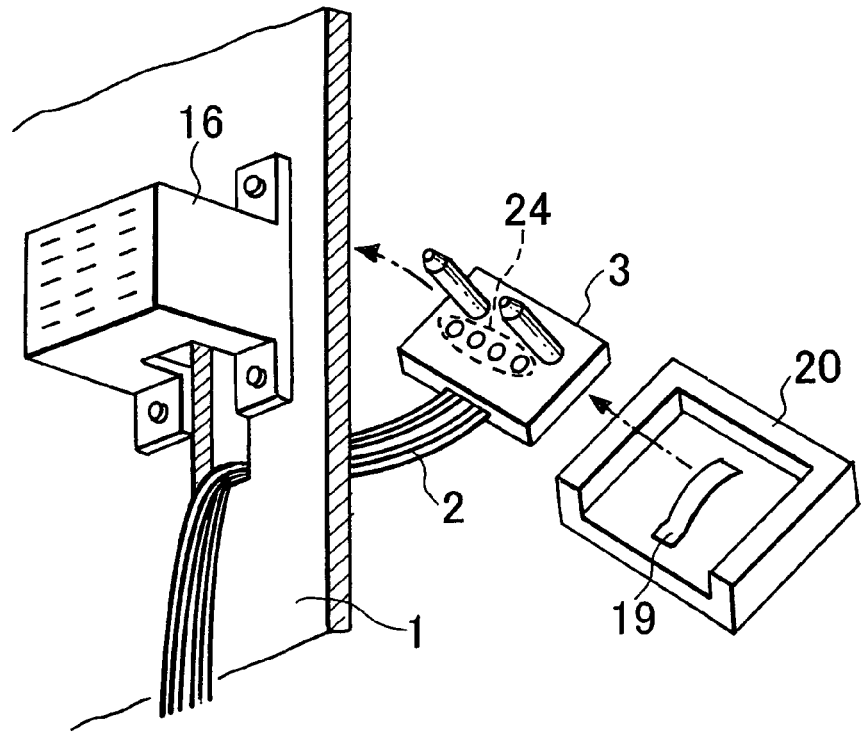
FIG. 13 is a view showing a method of attaching a lid to an optical connector.

FIG. 12A is an exploded sectional view of the arrangement when it is viewed from the upper side of a board, FIG. 12B is a sectional view of the arrangement viewed from the upper surface of the board in a state in which the board is inserted into an optical backplane. Further, FIG. 13 is a view showing a method of attaching the lid to an optical connector. In FIGS. 12A, 12B and FIG. 13, the same components as those of FIGS. 7 and 8 are denoted by the same reference numerals, and the explanation thereof is omitted.

A through-hole is formed to the optical backplane, and the lid 20 is disposed to close the through-hole. The photoelectric conversion module 6 can be taken out backward of the optical backplane 1 by lifting the lid 20, extracting a guide pin 10 of the optical connector 3 from a fitting hole 18 of the photoelectric conversion module 6 and drawing out it backward of the optical backplane 1. With this structure, when the photoelectric conversion module 6 fails, and the like, it can be easily removed and replaced while operating the equipment without extracting the board 4, thereby maintenability can be more improved. The lid 20 may be a door attached to the optical backplane 1.

Further, in the third embodiment, the electric connector 16 acting as the optical backplane connector may be divided into at least two components. Even in this arrangement, the photoelectric conversion module 6 can be accommodated in the electric connector 16.

Figure 14:
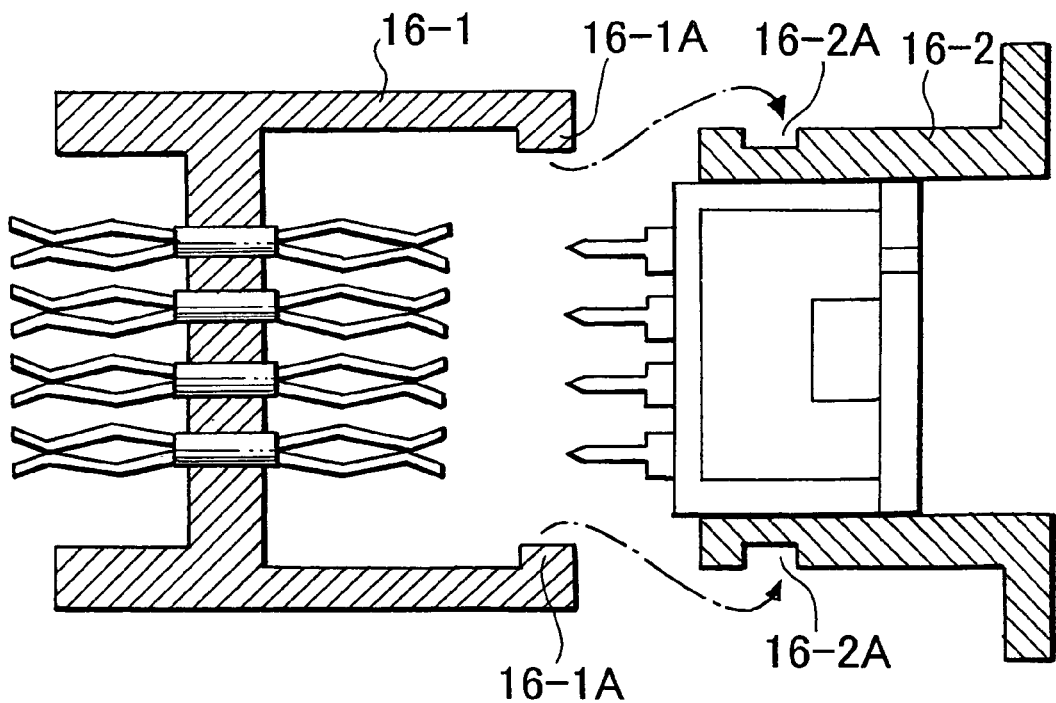
FIG. 14 is a sectional view of an electric connector.
Figure 15:
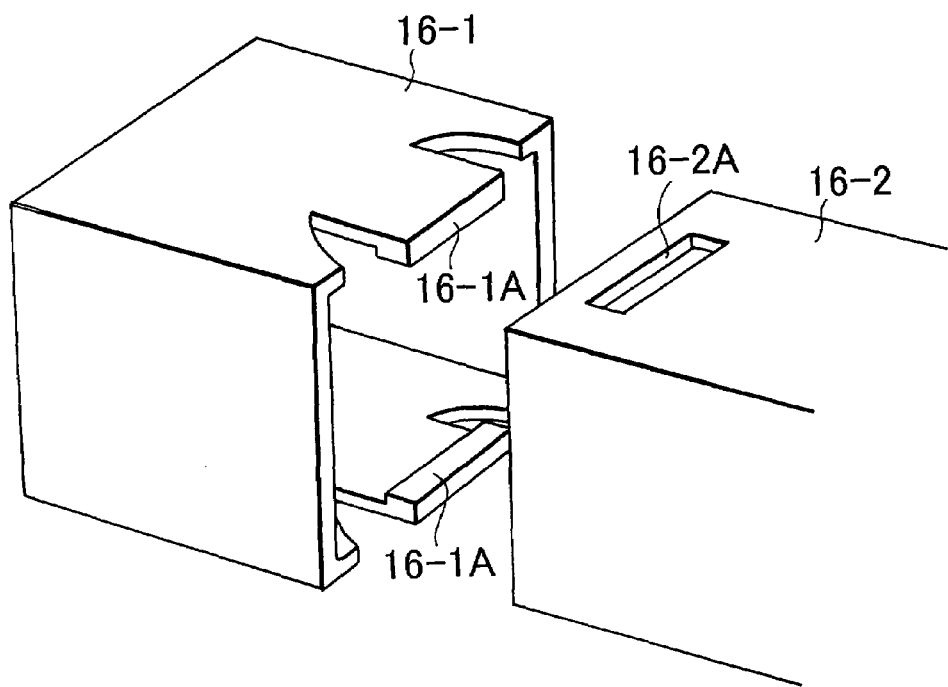
FIG. 15 is a sectional view of the electric connector.

FIG. 14 shows a sectional view of the electric connector 16, and FIG. 15 shows a perspective view of it. As shown in FIGS. 14 and 15, the electric connector 16 is made separable to two components 16-1 and 16-2, and after the photoelectric conversion module 6 is inserted into the component 16-2, the component 16-2 is inserted into the component 16-1 so that electric contacts of the component 16-1 are connected to electric contacts of the photoelectric conversion module 6. Otherwise, after the photoelectric conversion module 6 is inserted into the electric connector 16-1, the component 16-2 is inserted into the component 16-1. In this case, claw portions with convex portions (which are formed at two positions in this case) 16-1A are formed to an edge portion of the component 16-1, and concave portions 16-2A for receiving them are formed to the component 16-2, thereby the component 16-1 can be connected and fixed to the component 16-2. Otherwise, the component 16-2 can be also connected and fixed to the component 16-1 by forming the claw portions to the component 16-2 and forming the concave portions for receiving them to the component 16-1. Further, the component 16-1 may be inserted into the component 16-2, in place of that the component 16-2 is inserted into the component 16-1.

As described above, when the electric connector 16 is divided into the components 16-1 and 16-2, the photoelectric conversion module 6 can be replaced by removing the component 16-1 even in a state that the component 16-2 is fixed to the optical backplane 1.

In the respective arrangements of the third embodiment described above, the case that the overall photoelectric conversion module 6 is accommodated in the optical backplane connector has been explained. However, a part of the photoelectric conversion module 6 (for example, the light transmission substrate 22) may enter to the optical backplane side without being accommodated in the electric connector 16.

Further, in the third embodiment, the shape of the convex portion of the photoelectric conversion module 6 to be inserted into the concave portion of the electric connector 16 may be formed such that a convex portion of a part of the photoelectric conversion module 6 is inserted into a part of the concave portion. For example, the portion of the photoelectric conversion module 6, which is shown in FIG. 7 and includes the light transmission substrate 22, is formed so as to be inserted into a first concave portion 16A of the electric connector 16 and fitted thereinto. However, the portion having the electric contacts 21 may be formed smaller than a second concave portion 16B (concave portion located at the back of the first concave portion and smaller than the first concave portion) of the electric connector 16 so that it is not fitted to the second concave portion 16B (that is, the portion having the electric contacts 21 don't contact to the inside wall of the second concave portion 16B).

Further, in the third embodiment, the optical connector 3 may not be disposed so as to be in contact with the photoelectric conversion module 6. That is, after the photoelectric conversion module 6 is inserted into the electric connector 16, it may be closed by a lid with an opening or a door attached to the electric connector 16, and the optical connector 3 may be attached on the lid or on the door.

Further, in the third embodiment, it is sufficient that the photoelectric conversion module 6 be accommodated in the electric connector 16, and it is not always necessary to fit the photoelectric conversion module 6 to the concave portion of the electric connector 16. When reliability of connection can be sufficiently kept by the connection of, for example, the electric contacts 15 and 21, the photoelectric conversion module 6 need not have the convex shape to be inserted into the concave portion of the electric connector 16, and the photoelectric conversion module 6 need not come into contact with the inside wall of the concave portion of the electric connector 16.

Further, in FIGS. 7, 8, and 12, although the guide pin 10 or the fitting hole 18 and a light incoming and outgoing portion 24 are not disposed on a straight line, they may be disposed on the straight line. Further, the structure in which the electric contacts 21 are clamped by the electric contacts 15 is explained above, the electric contacts 15 may be clamped by the electric contacts 21 inversely.

Third Embodiment

FIG. 16 is a perspective view showing a connecting portion between a circuit substrate and the optical backplane in a third embodiment of the present invention in information processing equipment. In FIG. 16, the same components as those of FIGS. 2 and 15 are denoted by the same reference numeral, and the explanation thereof is omitted.

In the third embodiment, optical connectors 3-1 are disposed in about parallel to the main surface of a board 4 and optical connectors 3-2 are disposed at about a right angle to the main surface of the board 4. The disposing direction of the optical fibers of the optical connectors 3-1 is in about parallel to the main surface of a board 4 in the same way as the optical connectors 3 of FIG. 1. The disposing direction of the optical fibers of the optical connectors 3-2 is in nonparallel (here, at about a right angle) to the main surface of a board 4 in the same way as the optical connectors 3 of FIG. 2.

Five boards are attached to the optical backplane 1 shown in FIG. 16. Four optical connectors 5 are attached to the board on the left side in the figure, and the four optical connectors 5 are connected to the four optical connectors 3-1 on the optical backplane 1. The four optical connectors 3-1 are disposed approximately in parallel with the main surface of the board 4 (disposed in an up and down direction in the figure). One optical connector 5 is attached to each of the remaining four boards, and the optical connectors 5 on the remaining boards are connected to the remaining four optical connectors 3-2 on the optical backplane 1, respectively.

Figure 1:
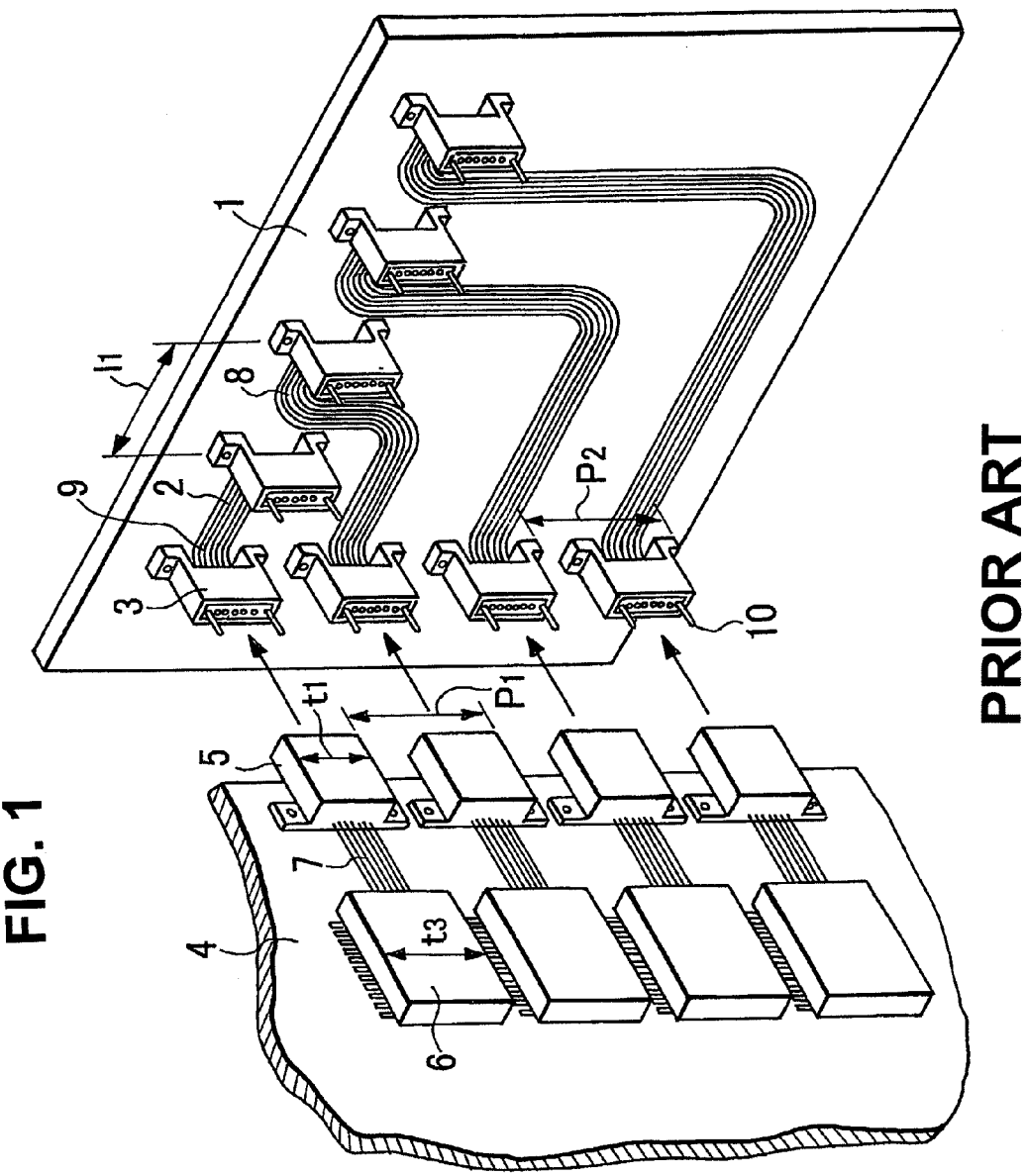
FIG. 1 is a perspective view showing a connection structure of information processing equipment of a conventional example.

Here, the disposing direction of the optical fibers of the optical connectors 5 attached to the board on the left side in the figure is in about parallel to the main surface of a board 4. The disposing direction of the optical fibers of the optical connectors 5 on the remaining boards is in nonparallel (here, at about a right angle) to the main surface of a board 4. In the third embodiment, the disposing direction of the optical fibers of the optical connectors 3-2 disposed at about a right angle to the main surface of the board 4 is in nonparallel to the main surface of a board 4 in the same way as FIG. 2. Consequently, the bypass portions 8 of the connector portions of the optical fibers between the optical connectors 3 as shown in FIG. 1 can be less bent, and thus a distance necessary to bend the optical fibers can be reduced (at 45° to 135°, almost no distance is necessary to bend the bypass portions 8 of the optical fibers, and, at about 90°, the bending itself of the bypass portions 8 of the connector portions can be eliminated). As a result, the pitch of the optical connectors 3 in the direction at about a right angle to the main surface of the board 4 can be reduced (pitch 12<pitch 11).

In FIG. 16, the optical connectors 3-2 are disposed on a line at about a right angle to the main surface of the board 4. However, the layout of the optical connectors 3-2 is not particularly limited to that of FIG. 16 and can be set arbitrarily. That is, the optical connectors 3-2 may be disposed to have a tilt at a constant angle to the main surface of the board 4. Further, the optical connectors 3-2 don't almost need to be disposed on a line. For example, the optical connector 3-2 disposed on the right side in the figure on the optical backplane 1 may be disposed on the right lower side so that the length of optical fibers 2 is shortened. These layouts are not particularly limited to the third embodiment and can apply to the first and second embodiment.

In the embodiments, when a plurality of optical signals are received by a circuit substrate in a juxtaposed state, or when a plurality of optical signals are output from a circuit substrate in a juxtaposed state, the optical signals are received or output in nonparallel with the main surface of the circuit substrate (preferably at 45° to 135° and most preferably at about 90° to the main surface of the circuit substrate). Consequently, as compared with the case that optical signals are received or output in parallel with the main surface of the circuit substrate, the width of the optical connectors can be reduced and thus the mounting density of the circuit substrate can be more increased.

Further, the disposing direction of the optical fibers of the optical connectors of the optical backplane, which receive optical signals from the circuit substrate or output optical signals to the circuit substrate, is made in nonparallel with the main surface of the circuit substrate (preferably at 45° to 135° and most preferably at about 90° to the main surface of the circuit substrate). As a result, the mounting density of the optical backplane can be also improved by reducing the pitch between the optical connectors by less bending the optical fibers or reducing the number of times of bending thereof. In particular, when the optical fiber connectors on the optical backplane side are installed such that the disposing direction of the optical fibers is at about a right angle (about 90°) to the surface of the board, connector bypass portions, which are necessary in a conventional case in which a board is disposed in parallel with an optical fiber array, are made unnecessary, thereby a connector pitch can be reduced. With this arrangement, the mounting density of the optical backplane can be increased. Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. An optical backplane, to which a circuit substrate is disposed at a substantially perpendicular angle; the optical backplane comprising:

at least one optical connector, disposed on the optical backplane, for transmitting optical signals to or receiving optical signals from the circuit substrate; and at least one array of juxtaposed optical fibers, connected to the at least one optical connector;

wherein a substantially straight imaginary line, connecting ends of the at least one array of optical fibers within the at least one optical connector, defines an alignment direction and is substantially nonparallel to a main surface of the circuit substrate.

2. An optical backplane, to which a circuit substrate is disposed at a substantially perpendicular angle; the optical backplane comprising:

at least one optical connector, disposed on the optical backplane, for transmitting optical signals to or receiving optical signals from the circuit substrate; and at least one array of juxtaposed optical fibers, connected to the at least one optical connector;

wherein ends of the at least one array of optical fibers are disposed within the at least one optical connector, and aligned in a direction substantially nonparallel to a main surface of the circuit substrate; and wherein the at least one optical connector comprises:
  a plurality of first optical connectors, aligned on the optical backplane in a row substantially parallel to the main surface of the circuit substrate; and
  a plurality of second optical connectors, aligned on the optical backplane in a row substantially perpendicular to the main surface of the circuit substrate;

wherein the at least one array of juxtaposed optical fibers connects the plurality of first optical connectors to the plurality of second optical connectors.

3. An optical backplane, to which a circuit substrate is disposed at a substantially perpendicular angle; the optical backplane comprising:

at least one optical connector, disposed on the optical backplane, for transmitting optical signals to or receiving optical signals from the circuit substrate; and at least one array of juxtaposed optical fibers, connected to the at least one optical connector;

wherein ends of the at least one array of optical fibers are disposed within the at least one optical connector, and aligned in a direction substantially nonparallel to a main surface of the circuit substrate;

wherein the at least one optical connector comprises:
  a plurality of first optical connectors, aligned on the optical backplane in a row substantially parallel to the main surface of the circuit substrate; and
  a plurality of second optical connectors, aligned on the optical backplane in a row substantially perpendicular to the main surface of the circuit substrate;

wherein the at least one array of juxtaposed optical fibers connects the plurality of first optical connectors to the plurality of second optical connectors; and wherein each of the plurality of first optical connectors and each of the plurality of second optical connectors comprises a light path in which light paths are converted:
  from substantially parallel to the optical backplane to substantially perpendicular to the optical backplane; or
  from substantially perpendicular to the optical backplane to substantially parallel to the optical backplane.

4. An optical backplane, to which a circuit substrate is disposed at a substantially perpendicular angle, the optical backplane comprising:

first optical connectors for transmitting optical signals to or receiving optical signals from the circuit substrate, the first optical connectors aligned on the optical backplane in a row substantially parallel to a main surface of the circuit substrate;

second optical connectors; and a plurality of optical fibers, each having a first end connected to one of the first optical connectors and a second end connected to one of the second optical connectors;

wherein at each of the first optical connectors, first ends of the optical fibers are aligned substantially parallel with the main surface of the circuit substrate, and at each of the second optical connectors, second ends of the optical fibers are aligned substantially nonparallel with the main surface of the circuit substrate.

5. A light transmission method for transmitting light signals from a first optical connector to a second optical connector, the first optical connector being disposed on a circuit substrate, and the second optical connector being disposed on an optical backplane, to which the circuit substrate is disposed at a substantially perpendicular angle, the method comprising:

outputting a plurality of optical signals from a plurality of optical fibers of the first optical connector, wherein a substantially straight imaginary line, connecting ends of the plurality of optical fibers within the first connector, defines an alignment direction and is substantially nonparallel to a main surface of the circuit substrate, and receiving the plurality of optical signals at a plurality of optical fibers of the second optical connector, when the first optical connector connects with the second optical connector.

6. A light transmission method for transmitting light signals from a second optical connector to a first optical connector, the first optical connector being disposed on a circuit substrate, and the second optical connector being disposed on an optical backplane, to which the circuit substrate is disposed at a substantially perpendicular angle, the method comprising:

outputting a plurality of optical signals from a plurality of optical fibers of the second optical connector, wherein a substantially straight imaginary line, connecting ends of the plurality of optical fibers within the second optical connector, defines an alignment direction and is substantially nonparallel to a main surface of the circuit substrate; and receiving the plurality of optical signals at a plurality of optical fibers of the first optical connector, when the first optical connector connects with the second optical connector.

* * * * *